United States Patent
Hsu et al.

(10) Patent No.: US 9,167,594 B2
(45) Date of Patent: Oct. 20, 2015

(54) METHOD AND RELATED DEVICE OF A TRIGGER MECHANISM OF BUFFER STATUS REPORT AND SCHEDULING REQUEST IN A WIRELESS COMMUNICATION SYSTEM

(75) Inventors: Chia-Chun Hsu, Taoyuan County (TW); Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 997 days.

(21) Appl. No.: 12/538,170

(22) Filed: Aug. 10, 2009

(65) Prior Publication Data

US 2010/0077100 A1    Mar. 25, 2010

Related U.S. Application Data

(60) Provisional application No. 61/098,801, filed on Sep. 22, 2008.

(51) Int. Cl.
*H04W 72/12* (2009.01)
*H04W 28/02* (2009.01)

(52) U.S. Cl.
CPC ...... *H04W 72/1221* (2013.01); *H04W 28/0278* (2013.01)

(58) Field of Classification Search
CPC . H04W 28/0278; H04W 72/00; H04W 72/12; H04W 72/1284
USPC .......................................................... 709/234
See application file for complete search history.

(56) References Cited

U.S. PATENT DOCUMENTS

| 7,433,337 | B2 | 10/2008 | Chao et al. | |
|---|---|---|---|---|
| 2004/0143617 | A1 | 7/2004 | Kohn | |
| 2006/0056346 | A1 | 3/2006 | Vadgama | |
| 2008/0225725 | A1 | 9/2008 | Wang | |
| 2009/0080380 | A1* | 3/2009 | Chun et al. | 370/329 |
| 2010/0135229 | A1* | 6/2010 | Lohr et al. | 370/329 |
| 2010/0177716 | A1 | 7/2010 | Harada | |
| 2010/0202420 | A1* | 8/2010 | Jersenius et al. | 370/329 |

(Continued)

FOREIGN PATENT DOCUMENTS

| CN | 1647410 A | 7/2005 |
|---|---|---|
| EP | 1750468 A1 | 2/2007 |

(Continued)

OTHER PUBLICATIONS

LG Electronics Inc. : "BSR for Persistent Scheduling", 3GPP TSG-RAN WG2 #61, R2-081070, Feb. 11-15, 2008, XP050138859.

(Continued)

*Primary Examiner* — Tom Y Chang
(74) *Attorney, Agent, or Firm* — Winston Hsu; Scott Margo

(57) ABSTRACT

A method of a trigger mechanism of buffer status report (BSR) and scheduling request (SR) for a media access control layer of a user equipment in a wireless communication system, the method including receiving a first data, identifying a state of semi-persistent scheduling (SPS) resource configuration and a type of the first data when the first data arrives at a transmission buffer and deciding a state of a BSR-SR triggering according to the state of SPS resource configuration, the type of the first data and a comparison between a size of a second data in the transmission buffer and a threshold.

2 Claims, 16 Drawing Sheets

(56) References Cited

U.S. PATENT DOCUMENTS

| | | | |
|---|---|---|---|
| 2010/0279695 A1* | 11/2010 | Amirijoo et al. | 455/438 |
| 2012/0039263 A1* | 2/2012 | Moberg et al. | 370/329 |

FOREIGN PATENT DOCUMENTS

| | | |
|---|---|---|
| JP | 2007529789 | 10/2007 |
| TW | 200824335 | 6/2008 |
| WO | 2006118427 A2 | 11/2006 |
| WO | 2009116939 A2 | 9/2009 |

OTHER PUBLICATIONS

European patent application No. 11005492.1, European Search Report mailing date: Oct. 21, 2011.

HTC Corporation, "BSR Triggering with Semi-Persistent Scheduling", 3GPP TSG-RAN WG2 #63bis, R2-085201, Sep. 29-Oct. 3, 2008, Prague, Czech, XP050320107, p. 1-7.

European patent application No. 11003339.6, European Search Report mailing date: Aug. 5, 2011.

3GPP TS 36.321 V8.2.0 (May 2008), "3rd Generation Partnership Project; Technical Specification Group Radio Access Network; Evolved Universal Terrestrial Radio Access (E-UTRA) Medium Access Control (MAC) protocol specification (Release 8)", cover page+ p. 2, 18-23.

Office action mailed on Jan. 31, 2013 for the Taiwan application No. 098129233, filing date Aug. 31, 2009, p. 1-3.

Office action mailed on Apr. 28, 2014 for the China application No. 201210154065.2, filing date: Sep. 7, 2009.

3GPP TS 36.321 v8.3.0 MAC specification, Sep. 2008.

3GPP TSG-RAN2 #61bis R2-081468, Mar. 2008.

3GPP TSG-RAN2 #61bis R2-081598, Mar. 2008.

* cited by examiner

| | Regular or periodic BSR | | Padding BSR | | |
|---|---|---|---|---|---|
| | Number of non-empty LCG=1 | Number of non-empty LCG>1 | Enough space for long BSR | Not enough space for long BSR | |
| | | | | Number of non-empty LCG=1 | Number of non-empty LCG>1 |
| Original spec | Short BSR | Long BSR | Long BSR | Short BSR | Truncated BSR |

METHOD AND RELATED DEVICE OF A TRIGGER MECHANISM OF BUFFER STATUS REPORT AND SCHEDULING REQUEST IN A WIRELESS COMMUNICATION SYSTEM

CROSS REFERENCE TO RELATED APPLICATIONS

This application claims the benefit of U.S. Provisional Application No. 61/098,801, filed on Sep. 22, 2008 and entitled "METHOD AND RELATED DEVICE FOR TRIGGER MECHANISM OF SCHEDULING REQUEST AND BUFFER STATUS REPORT IN WIRELESS COMMUNICATIONS SYSTEM" the contents of which are incorporated herein.

BACKGROUND OF THE INVENTION

1. Field of the Invention

The present invention relates to a method and related communication device for a trigger mechanism of buffer status report (BSR) and scheduling request (SR) in a wireless communication system, and more particularly, to a method and related communication device for using a threshold to decide when to trigger a BSR-SR.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the 3GPP associated specifications, logical channels are defined as service access points between a Media Access Control (MAC) layer and a Radio Link Control (RLC) layer. The MAC provides data transfer services on logical channels. Each logical channel type is defined by the type of information to be transferred. A Radio Resource Control (RRC) layer can control the scheduling of uplink data by giving each logical channel a priority.

According to the current 3GPP MAC specification, a buffer status reporting procedure is used to provide information about the size of data in uplink (UL) buffers of a UE for a serving eNB. A buffer status report (BSR) is triggered when UL data belonging to a logical channel with higher priority than those for which data already existed in the UE transmission buffer arrives at a UE transmission buffer. In addition, a scheduling request (SR) is used to request UL resources. The SR is triggered when the UE does not have a UL resource allocated for the current transmission time interval (TTI), which implies that a dedicated SR (D-SR) is transmitted on the physical uplink control channel (PUCCH) if the UL resource is allocated to the UE, or alternatively a random access SR (RA-SR) is transmitted on the random access channel (RACH). The pending SR is cancelled when new resources are available on UL-SCH, which is granted by eNB through dynamically scheduling.

In order to utilize shared channel (SCH) resources, a dynamic scheduling (DS) function is used in MAC. When sharing resources between UEs, MAC in eNB dynamically allocates physical layer resources for the DL-SCH and UL-SCH depends on the traffic volume, the QoS requirements of each UE and associated radio bearers. On the other hand, a semi-persistent scheduling (SPS) is introduced in LTE system and is also used in MAC for serving upper layer applications which generates semi-static size data periodically, e.g. VoIP services. SPS is more efficient than DS for VoIP data transmission.

According to the current UE MAC specification, an SR is triggered without considering the already allocated UL grant requested through DS or assigned by SPS. Only the current TTI is considered when making the decision of triggering the SR. This UE behavior results in several issues described as follows.

The first issue is described as follows. Please refer to FIG. 1, which is a timing diagram illustrating a relationship between an allocated UL grant and an SR in dynamic scheduling according to the prior art. In FIG. 1, there is a time gap Tg between a physical downlink control channel (PDCCH) UL grant and an actual UL transmission on a physical uplink shared channel (PUSCH), typically around 4 ms in E-UTRAN. In other words, when a UL grant is received in subframe n, the actual UL transmission takes place in subframe (n+4). After receiving a PDCCH UL grant, the UE decodes and processes the received information, which takes a processing time Tp, normally less than 2 ms. Therefore, there is a window with a length (Tg-Tp) in which the UE acknowledges the upcoming allocated UL grant 1 but does not have a UL resource allocation for several TTIs before the upcoming UL grant 1.

During this window, if new UL data arrives at a transmission buffer and the new UL data belongs to a logical channel with higher priority than those for which data already existed in the transmission buffer, a BSR and the associated SR, abbreviated to BSR-SR, is triggered. If the total available data (new arriving data plus the existed data) in the transmission buffer could be accommodated in the upcoming allocated UL grant 1, the transmission buffer would be empty after the allocated UL grant 1, and the latter assigned UL grant 2 is therefore wasted. In this situation, BSR-SR triggering is unnecessary.

When SPS resources are configured, the second issue happens and is described as follows. Please refer to FIG. 2, which is a timing diagram illustrating a relationship between an allocated SPS UL resource and an SR according to the prior art. As shown in FIG. 2, SPS data, such as VoIP data, enters the transmission buffer and an SR is generated. An assigned UL grant may arrive before or after an SPS resource, as a UL grant 1 or a UL grant 2 shown in FIG. 2. If the UL grant comes before a certain SPS resource, the SPS data is transmitted in the UL grant 1 and the latter SPS resource is left empty. On the other hand, if the UL grant comes after the certain SPS resource, the SPS data is transmitted in the latter SPS resource and the UL grant 2 is left empty. The SR in the above situation is called a "premature SR".

Premature SR also results from the fact that there is no guarantee that SPS data packets delivery is synchronized with periodic SPS resources. Generally, periodicity of SPS data delivery from a higher layer and periodicity of SPS resources are identical. Note that, when SPS data arrives at the transmission buffer, the UE needs a processing time to process the SPS data before it is actually transmitted. If the SPS data is ready for transmission at the TTI of SPS resource, i.e. the two processes are "synchronized". If the SPS data does not catch the SPS resource, which is called "unsynchronized", the UE considers that it does not have an SPS UL resource allocated for the current TTI and a premature SR is triggered.

In accordance with the first issue and the second issue, it is known that wasting an allocated UL grant results in unnecessary BSR-SR triggering and inefficient use of UL resources. Moreover, the problem deteriorates in the presence of SPS, which is designed for time-critical applications.

The third issue is described as follows. Note that when SPS resources are configured, data belonging to a logical channel except SPS logical channels is called lower priority data. According to the current specification, when lower priority data arrives at the transmission buffer, aBSR is not triggered when SPS data available for transmission is never emptied and simply sits in the transmission buffer. As a result, the potential starvation for transmission of the lower priority data may happen.

Besides, in the current MAC specification, a pending SR shall be cancelled until UL-SCH resources are granted for a new transmission. It is not clear whether these UL-SCH resources for new transmission include periodic new SPS transmissions without any PDCCH assignment. If periodic SPS transmissions would cancel the pending SR, the short-lived SR may be cancelled prematurely, and even worse, cancelled periodically. Please refer to FIG. 3, which is a timing diagram illustrating a relationship between SPS resources and lower priority data according to the prior art. As shown in FIG. 3, starvation for transmission of lower priority data happens when SPS data available for transmission is never emptied.

The fourth issue is described as follows. There are three types of BSRs for different triggering events, a regular BSR, a periodic BSR and a padding BSR. The regular BSR is triggered when UL data arrives at the UE transmission buffer and the UL data belongs to a logical channel with higher priority than those for which data already existed in the UE transmission buffer, or is triggered when a serving cell change occurs. The periodic BSR is triggered when a periodic BSR timer expires. The padding BSR is triggered when UL resources are allocated and an amount of padding bits is equal to or greater than the size of the BSR MAC control element.

Besides, there are three types of BSR format, long, short, and truncated BSR. Please refer to FIG. 4, which is a table of triggering events and corresponding BSR formats according to the prior art. Long BSR is used by regular BSR and periodic BSR if there are more than two logical channel groups (LCGs) having buffered data, and is used by padding BSR if the amount of padding bits is large enough. Short BSR is used by regular BSR and periodic BSR if there is only one LCG having buffered data, and is used by padding BSR if there is only one LCG having buffered data and the amount of padding bits is not large enough for long BSR. The truncated BSR is used by padding BSR when there are more than one LCG having buffered data and the amount of padding bits is not large enough for long BSR.

Before SPS is introduced, there is no obstacle for the eNB to know the real buffer status of the UE through the current BSR mechanism. However, when SPS is configured, the current BSR mechanism becomes sub-optimal. For padding BSR in the current specification, when the number of non-empty LCG is greater than 1, the UE reports a truncated BSR of the LCG with the highest priority logical channel. When SPS is configured, the highest priority logical channel is usually SPS logical channel and therefore the truncated BSR would always report LCG of SPS logical channel. However, since the SPS resources are already allocated, most of time, the eNB does not really need that information.

The fifth issue is described as follows. Please refer to FIG. 5, which is a timing diagram of a multiple-SPS-pattern scheme for TDD (Time Division Duplex) mode. The multiple-SPS-pattern scheme is designed to deal with frequent collision between initial transmissions and retransmissions. Two different intervals, T1 and T2, interchange with each other continuously and the sum of two intervals equals two times of the SPS period.

Therefore, even though the average SPS UL resource is still one per SPS period, the separation between adjacent SPS resources is not identical anymore. Another way to understand is there are two patterns sharing the same period but being initiated at different times. SPS resource allocation in TDD mode meets the same problems, e.g. premature SR and starvation for transmission of lower priority data, as it in FDD (Frequency Division Duplex) mode.

SUMMARY OF THE INVENTION

The present invention therefore provides a method and related communication device for a trigger mechanism of buffer status report (BSR) and scheduling request (SR) for a media access control (MAC) layer of a user equipment in a wireless communication system.

The present invention discloses a method of a trigger mechanism of BSR and SR for a MAC layer of a user equipment in a wireless communication system including receiving a first data, identifying a state of semi-persistent scheduling (SPS) resource configuration and a type of the first data when the first data arrives at a transmission buffer, and deciding a state of a BSR-SR triggering according to the state of SPS resource configuration, the type of the first data, and a comparison between a size of a second data in the transmission buffer and a threshold.

The present invention further discloses a communication device of a wireless communication system for a trigger mechanism of BSR and SR for a MAC layer. The communication device includes a computer readable recording medium, for storing program code corresponding to a process, and a processor coupled to the computer readable recording medium, for processing the program code to execute the process. The process includes receiving a first data, identifying a state of SPS resource configuration and a type of the first data when the first data arrives at a transmission buffer, and deciding a state of a BSR-SR triggering according to the state of SPS resource configuration, the type of the first data, and a comparison between a size of a second data in the transmission buffer and a threshold.

The present invention further discloses a method of a trigger mechanism of BSR and SR when SPS resources are configured for a MAC layer of a user equipment in a wireless communication system including receiving SPS data from a higher layer, and synchronizing the SPS data delivery and SPS resource arrival, for the SPS data being ready for transmission at the transmission time intervals of the SPS resources arrival.

The present invention further discloses a communication device of a wireless communication system for a trigger mechanism of BSR and SR when SPS resources are configured for a MAC layer. The communication device includes a computer readable recording medium, for storing program code corresponding to a process, and a processor coupled to the computer readable recording medium, for processing the program code to execute the process. The process includes receiving SPS data from a higher layer, and synchronizing the SPS data delivery and SPS resource arrival, for the SPS data being ready for transmission at the transmission time intervals of the SPS resources arrival.

The present invention further discloses a method of a trigger mechanism of BSR and SR when SPS resources are configured for a MAC layer of a user equipment in a wireless communication system including receiving data, and when the data arrives at a transmission buffer and the data belongs to a logical channel with higher priority than those, except SPS logical channels, for which data already existed in the transmission buffer, triggering a BSR-SR.

The present invention further discloses a communication device of a wireless communication system for a trigger mechanism of BSR and SR when SPS resources are configured for a MAC layer. The communication device includes a computer readable recording medium, for storing program code corresponding to a process, and a processor coupled to the computer readable recording medium, for processing the program code to execute the process. The process includes receiving data, and when the data arrives at a transmission buffer and the data belongs to a logical channel with higher priority than those, except SPS logical channels, for which data already existed in the transmission buffer, triggering a BSR-SR.

The present invention further discloses a method of a trigger mechanism of BSR and SR when SPS resources are configured for a MAC layer of a user equipment in a wireless communication system including making truncated BSR format to report a logical channel group (LCG) with a first logical channel which is decided according to a comparison between a size of accumulated SPS data in a transmission buffer and a threshold, and reporting a padding BSR with the truncated BSR format when an amount of padding bits is not enough for long BSR format and more than one LCG has buffered data.

The present invention further discloses a communication device of a wireless communication system for a trigger mechanism of BSR and SR when SPS resources are configured for a MAC layer. The communication device includes a computer readable recording medium, for storing program code corresponding to a process, and a processor coupled to the computer readable recording medium, for processing the program code to execute the process. The process includes making truncated BSR format to report a LCG with a first logical channel which is decided according to a comparison between a size of accumulated SPS data in a transmission buffer and a threshold, and reporting a padding BSR with the truncated BSR format when an amount of padding bits is not enough for long BSR format and more than one LCG has buffered data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table of triggering events and corresponding BSR formats according to the prior art.

DETAILED DESCRIPTION

Figure 6:
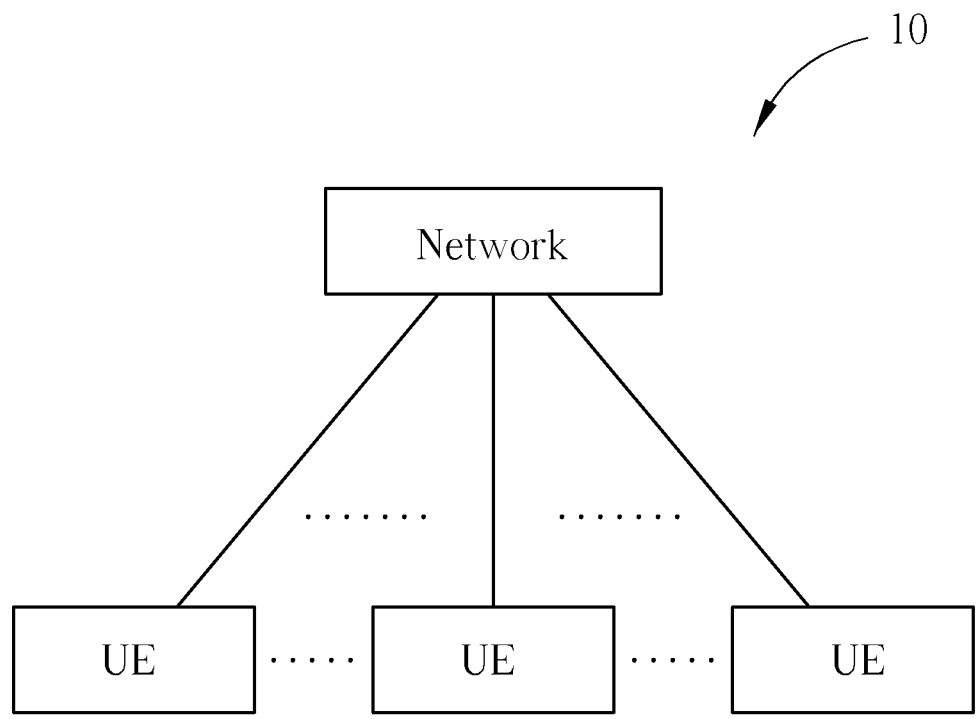
FIG. 6 is a schematic diagram of a wireless communication system.

Please refer to FIG. 6, which is a schematic diagram of a wireless communication system 10 according to an embodiment of the present invention. The wireless communication system 10 is an LTE (long-term evolution) system or other mobile communication systems, and is briefly composed of a network and a plurality of user equipments (UEs). In FIG. 6, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 7:
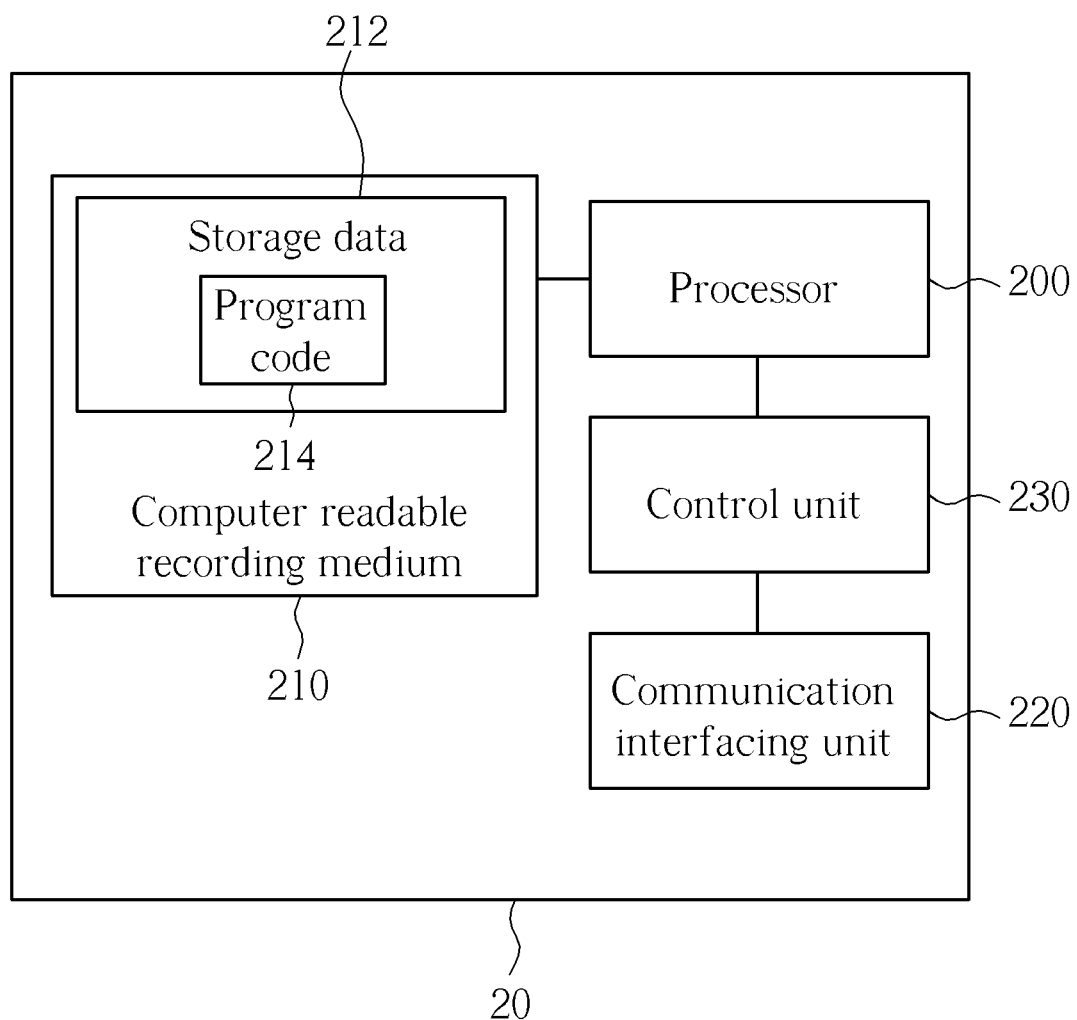
FIG. 7 is a schematic diagram of a communication device according to embodiments of the present invention.

Please refer to FIG. 7, which is a schematic diagram of a communication device 20 according to embodiments of the present invention. The communication device 20 can be the UE shown in FIG. 7 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 8:
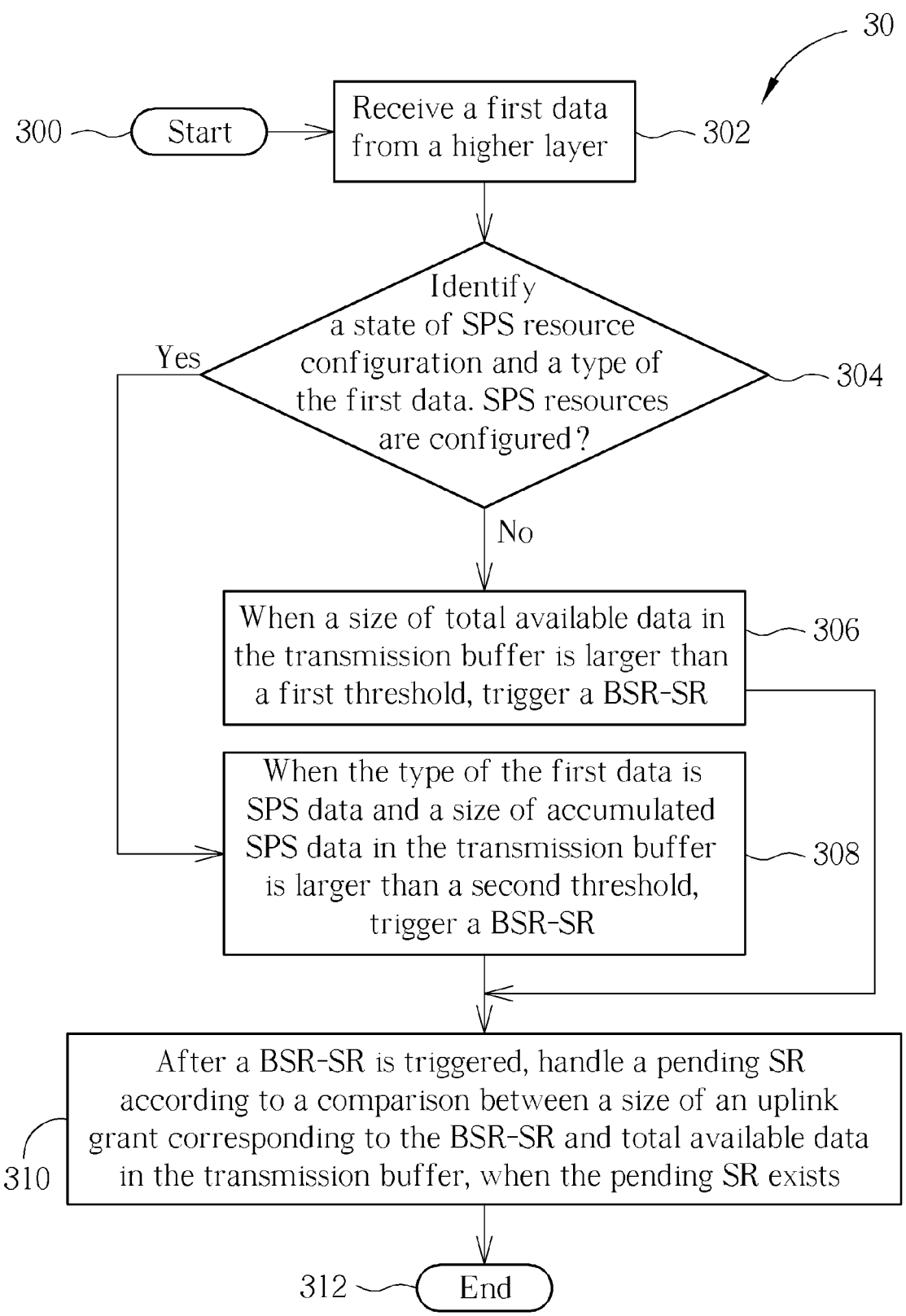
FIG. 8 is flowchart of a process according to an embodiment of the present invention.

As the first issue mentioned previously, a scheduling request (SR) is triggered without considering the already allocated UL grant requested through dynamic scheduling (DS). In the second issue, when the eNB configures semi-persistent scheduling (SPS) resources for the UE, a premature SR is triggered without considering already allocated SPS UL resources. The first and the second issues both result in waste of a PDCCH UL grant or a SPS UL resource. Please refer to FIG. 8, which is a flowchart of a process 30 according to an embodiment of the present invention. The process 30 is utilized in a Media Access Control (MAC) layer in a UE in the wireless communication system 10 for solving the first issue and the second issue, for improving a trigger mechanism of BSR-SR. The process 30 can be compiled into the program code 214 and includes the following steps:

Step 300: Start.

Step 302: Receive a first data from a higher layer.

Step 304: When the first data arrives at a transmission buffer, identify a state of SPS resource configuration and a type of the first data. If SPS resources are not configured, perform Step 306; else, perform Step 308.

Step 306: When a size of total available data in the transmission buffer is larger than a first threshold, trigger a BSR-SR.

Step 308: When the type of the first data is SPS data and a size of accumulated SPS data in the transmission buffer is larger than a second threshold, trigger a BSR-SR.

Step 310: After a BSR-SR is triggered, handle a pending SR according to a comparison between a size of an uplink grant corresponding to the BSR-SR and total available data in the transmission buffer, when the pending SR exists.

Step 312: End.

According to the process 30, when the first data arrives, the UE MAC first identifies whether the SPS resources are configured (which respectively corresponds to the situation of the first and the second issues). In Step 306, on condition that the SPS resources are not configured, the total available data is the received first data plus data already existed in the transmission buffer. The first threshold is set to a specific value; for example, the first threshold is set to a size of the already allocated UL grant (bytes). As mentioned previously, there is a window in which the UE acknowledges the upcoming allocated UL grant but does not have a UL resource allocation for several TTIs before the allocated UL grant, and therefore the UE can set the first threshold after receiving the information of the upcoming allocated UL grant. There are several ways to set the first threshold and are introduced later.

According to Step 306, when the first data arrives at the transmission buffer when SPS resources are not configured, i.e., the first data is definitely not SPS data, the BSR-SR is triggered only when the size of the total available data in the transmission buffer is larger than the specific value as the size of the already allocated UL grant. Therefore, an associated BSR-SR is triggered under absolute necessary, which prevents from waste of UL grant.

Figure 9:
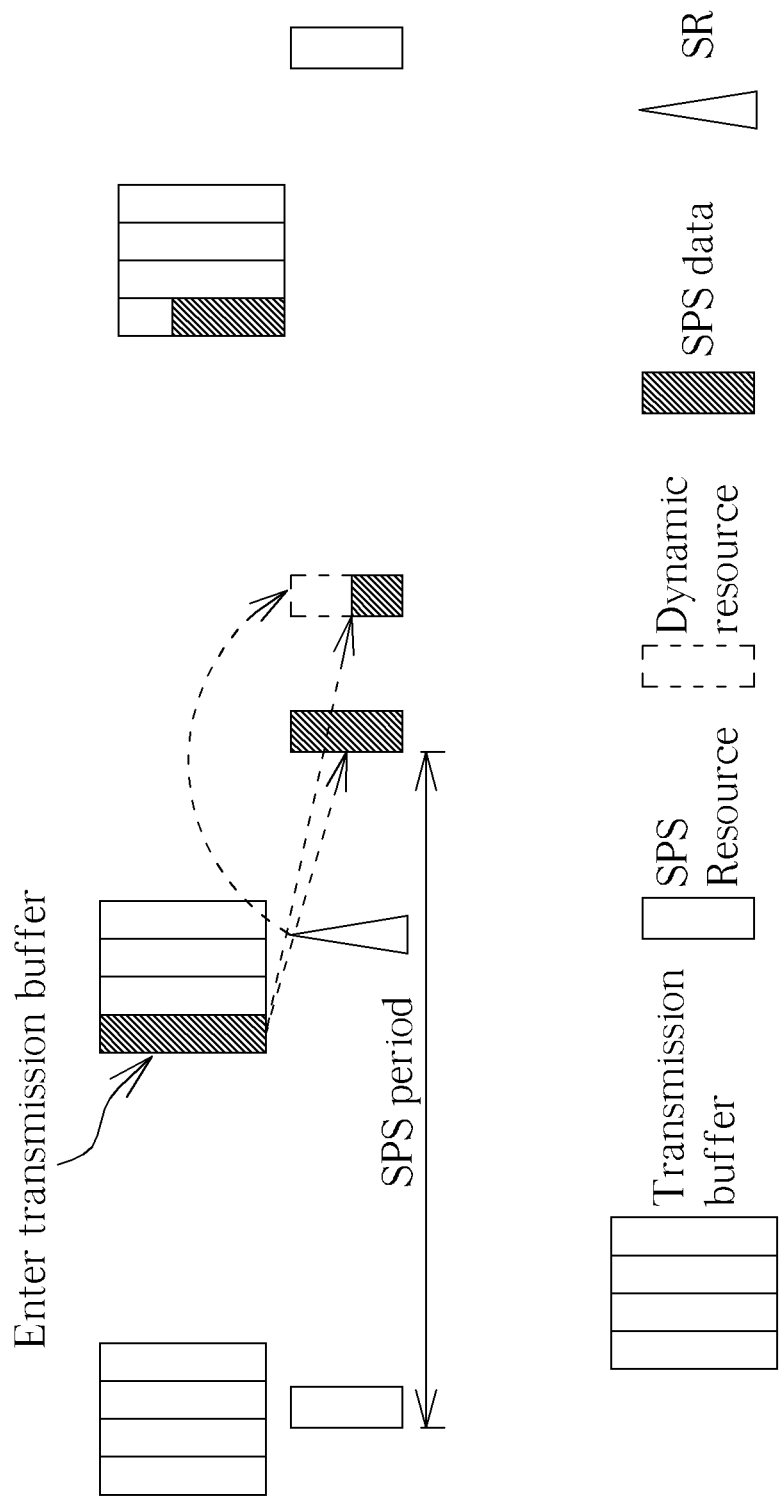
FIG. 9 is a timing diagram illustrating a relationship between SPS data and SPS resources according to the process in FIG. 8.

On the other hand, in Step 308, on condition that the SPS resources are configured, when the type of the first data is data of SPS logical channel, called SPS data, the second threshold is set to a specific value, such as a size of an allocated SPS UL resource. If the SPS data arrives at the transmission buffer, the BSR-SR is triggered only when the size of the accumulated SPS data is larger than the size of the allocated SPS UL resource. In other words, the BSR-SR is triggered only when the allocated SPS resource are not enough Please refer to FIG. 9, which is a timing diagram illustrating a relationship between SPS data and SPS resources according to the process 30. As shown in FIG. 9, the allocated SPS resource is not enough so that a BSR-SR is triggered to request the eNB to assign a UL grant through dynamic scheduling for transmission of the SPS data burst. Note that, the BSR is usually transmitted with SPS data in the incoming SPS resource, and is not denoted in FIG. 9.

From the above, the present invention uses a threshold mechanism to decide to trigger a BSR-SR or not. When the first data arrives at the transmission buffer, different thresholds are used according to whether the SPS resources are configured and what type of the first data is. In other words, Step 306 and Step 308 can be integrated into a single step: decide a state of a BSR-SR triggering according to the state of SPS resource configuration, the type of the first data, and a comparison between a size of the second data in the transmission buffer and a threshold. Whether the second data is the total available data or the accumulated SPS data depends on the state of SPS resource configuration and the type of the first data. Besides, in order to use the threshold mechanism, the UE has to add required system parameter(s) to enable the use of the threshold.

After the BSR-SR is triggered for requesting UL grant, according to Step 310, when a pending SR exists, the UE further handles the pending SR according to a comparison between a size of the allocated UL grant corresponding to the BSR-SR and total available data in the transmission buffer. When the allocated UL grant is enough to transmit the total available data existed in the transmission buffer, the pending SR is no longer necessary and is cancelled. When the allocated UL grant is not enough to transmit the total available data, the pending SR is still useful for requesting another UL grant; therefore, the UE remains the pending SR.

In the prior art, when data arrives at the transmission buffer, only UL resource allocated for the current TTI is considered when the UE makes the decision of triggering a BSR, whether SPS resources are configured. As a result, an unnecessary BSR-SR is triggered and an assigned UL grant or an SPS resource is wasted. According to the above-mentioned embodiment of the present invention, when data arrives at the transmission buffer, the MAC decides to trigger the BSR or not according to the state of SPS resource configuration, the type of the received first data and the threshold mechanism that performs the comparison between the size of the second data in the transmission buffer and the proper threshold. Therefore, the BSR-SR is triggered under absolute necessary and the UL resources are used more efficiently.

There are several ways to set the threshold in the process 30. The first threshold can be set according to the information of allocated UL grant previously. The threshold can be set based on UL grants information, for example, a size of a UL grant (whether it is a PDCCH UL grant or an SPS UL grant) or more than one UL grant, or combination of different kinds of UL grants, e.g. combination of SPS UL grants and PDCCH UL grants. The threshold can also be set according to UL sources in a predefined time window, e.g. next N subframes or SPS periods. Furthermore, the threshold can be set to a specific value by MAC or RRC, and the specific value may be predetermined in the system, in this way the threshold is not set according to any UL grant or time window.

In addition, the BSR-SR triggering can be controlled based on per logical channel or per logical channel group (LCG) basis through the threshold mechanism. For example, when there are more than one SPS service configured on separated logical channels, the separated logical channels can be assigned to a single LCG or not, and in this situation, the threshold(s) of the accumulated SPS data in the transmission buffer can be set for each logical channel or each LCG, depending on the type of control the UE intends. In the situation that the UE simply does not want data belonging to a certain logical channel to trigger a BSR-SR or to be included in a BSR, a threshold for the certain logical channel can be set to infinity by not allocating the logical channel to any LCG.

The flexibility of the threshold mechanism depends on memory resources the UE allocated to store the threshold(s).

Figure 10:
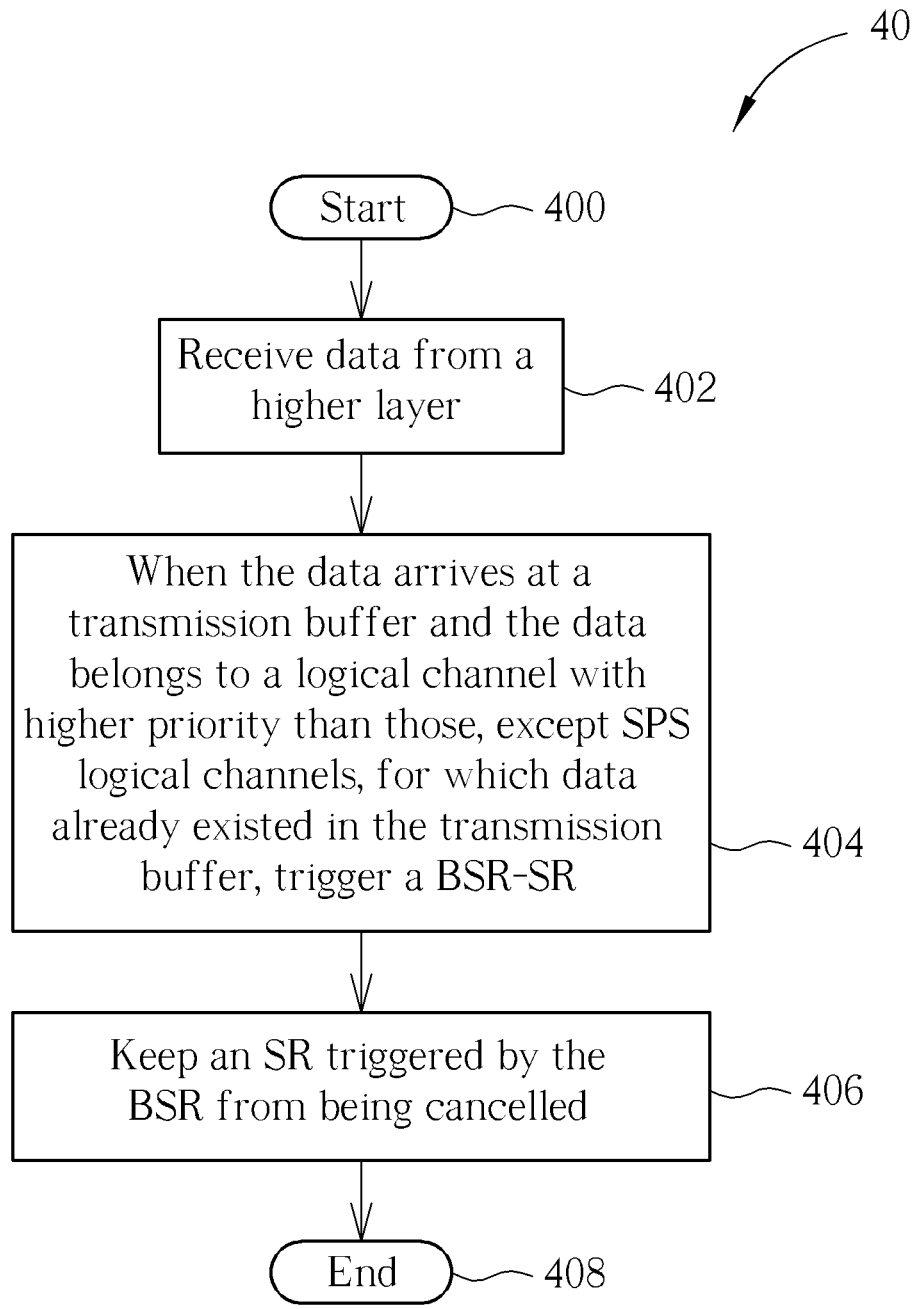
FIG. 10 is a flowchart of a process according to an embodiment of the present invention.

As the third issue mentioned previously, if the SPS resources are configured, lower priority data cannot trigger a BSR and simply sits in the transmission buffer. Please refer to FIG. 10, which is a flowchart of a process 40 according to an embodiment of the present invention. The process 40 is utilized in the UE MAC when SPS resources are configured, for solving the third issue of stall of lower priority data, for improving a trigger mechanism of BSR-SR. The process 40 can be compiled into the program code 214 and includes the following steps:

Step 400: Start.

Step 402: Receive data from a higher layer.

Step 404: When the data arrives at a transmission buffer and the data belongs to a logical channel with higher priority than those, except SPS logical channels, for which data already existed in the transmission buffer, trigger a BSR-SR.

Step 406: Keep an SR triggered by the BSR from being cancelled.

Step 408: End.

Figure 11:
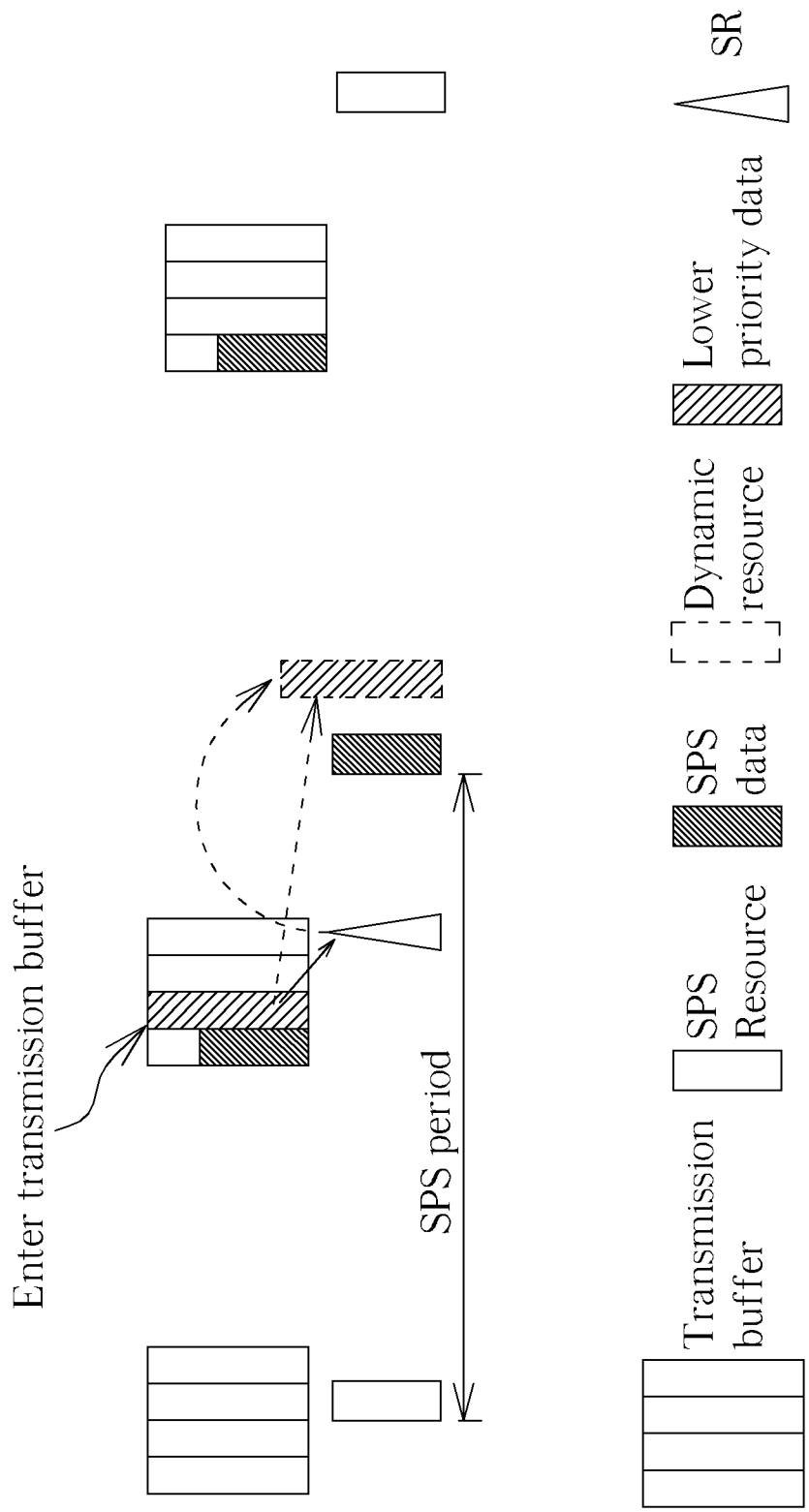
FIG. 11 is a timing diagram illustrating a relationship between an allocated UL grant and lower priority data according to the process in FIG. 10.

The data belonging to a logical channel except SPS logical channels is called lower priority data. According to the process 40, on condition that the SPS resources are configured, when the arriving lower priority data belongs to a logical channel with higher priority than those, except SPS logical channels, for which data already existed in the transmission buffer, the UE MAC triggers the BSR-SR. Besides, the UE MAC keeps the SR triggered by the BSR from being cancelled, so that the eNB can receive the request for a UL grant for transmission of the lower priority data. Please refer to FIG. 11, which is a timing diagram illustrating a relationship between an allocated UL grant and lower priority data according to the process 40. As shown in FIG. 11, when lower priority data arrives, a BSR-SR is triggered even if there is SPS data available for transmission, and the SR is not cancelled by new SPS transmission. Finally, the eNB assigns a UL grant and the lower priority data is therefore transmitted instead of staying in the transmission buffer.

In the prior art, when the lower priority data arrives, the BSR-SR cannot be triggered when SPS data available for transmission is never emptied. Even if the process 30 is applied, the lower priority data still has no chance to be transmitted when accumulated SPS data in the transmission buffer is not over a threshold. Furthermore, periodic SPS transmissions may cancel the pending SR. In comparison, the process 40 not only triggers the BSR-SR when the lower priority data arrives but also allows the SR remaining even with the periodic SPS transmissions, and therefore the stall of non-SPS data is avoided.

Figure 12:
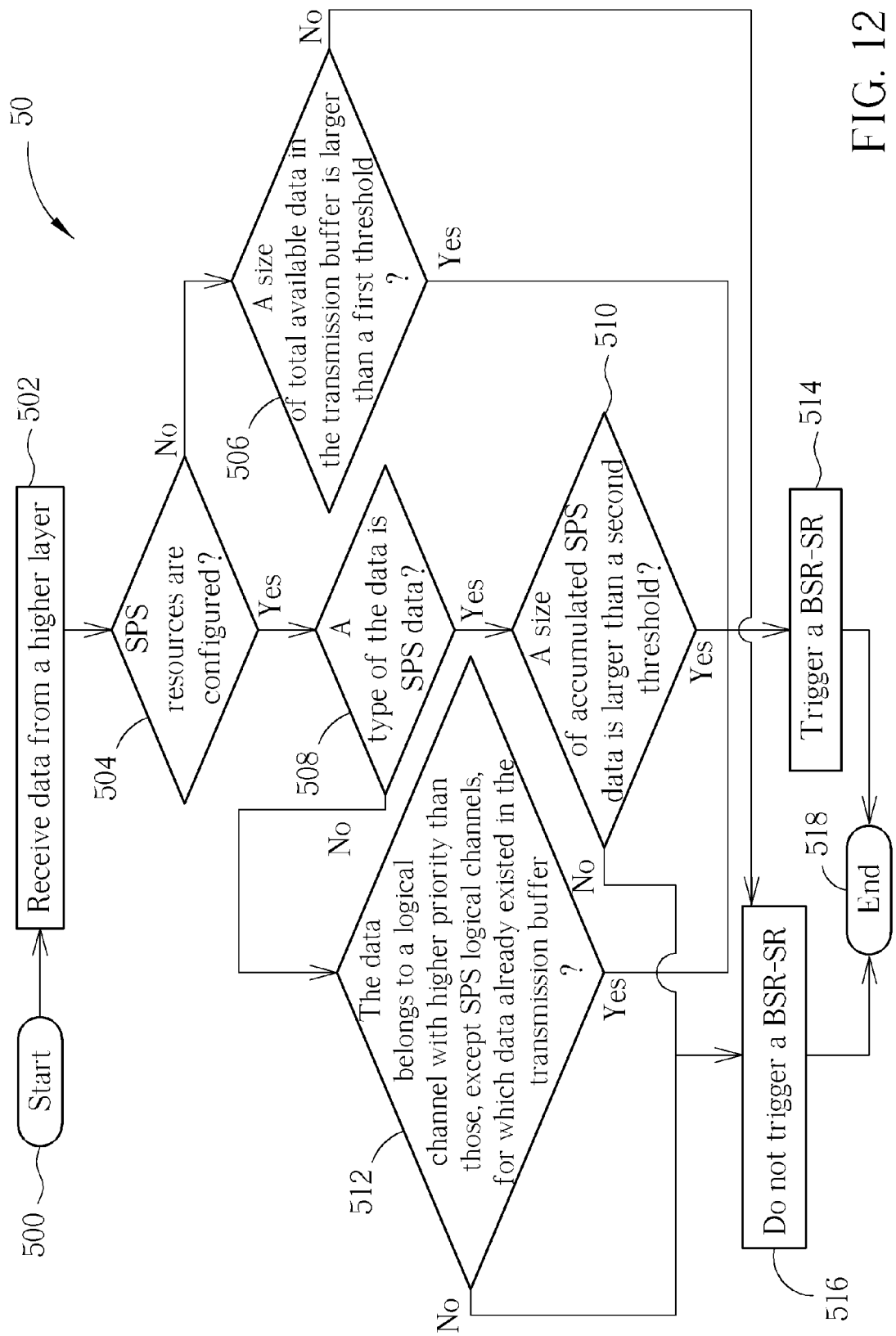
FIG. 12 is a flowchart of a process according to an embodiment of the present invention.

Please refer to FIG. 12, which is a flowchart of a process 50 according to an embodiment of the present invention. The process 50 is utilized in the UE MAC and can be regarded as a combination of the processes 30 and 40 for solving the first issue, the second issue and the third issue. The process 50 can be compiled into the program code 214 and includes the following steps:

Step 500: Start.

Step 502: Receive data from a higher layer.

Step 504: When the data arrives at a transmission buffer, identify whether SPS resources are configured. If the SPS resources are not configured, perform Step 506; else, perform Step 508.

Step 506: If a size of total available data in the transmission buffer is larger than a first threshold, perform Step 514; else, perform Step 516.

Step 508: Identify whether a type of the data is SPS data. If the type of the data is SPS data, perform Step 510; else, perform Step 512.

Step 510: If a size of accumulated SPS data is larger than a second threshold, perform Step 514; else, perform Step 516.

Step 512: If the data belongs to a logical channel with higher priority than those, except SPS logical channels, for which data already existed in the transmission buffer, perform Step 514; else, perform Step 516.

Step 514: Trigger a BSR-SR.

Step 516: Do not trigger a BSR-SR.

Step 518: End.

A branch formed by Steps 504, 506 and 514 solves the first issue, as Step 304 and Step 306 of the process 30 do. A branch formed by Steps 504, 508, 510 and 514 solves the second issue, as Step 304 and Step 308 of the process 30 do. A branch formed by Step 504, 508, 512 and 514 solves the third issue, as the process 40 does. In the process 50, the first threshold used in Step 506 is set according to an allocated PDCCH UL grant, and the second threshold used in Step 510 is set according to an allocated SPS UL grant. The first threshold and the second threshold can also be set according to a size of UL grants or the sum of UL grants in a time window, which is described previously.

Figure 13:
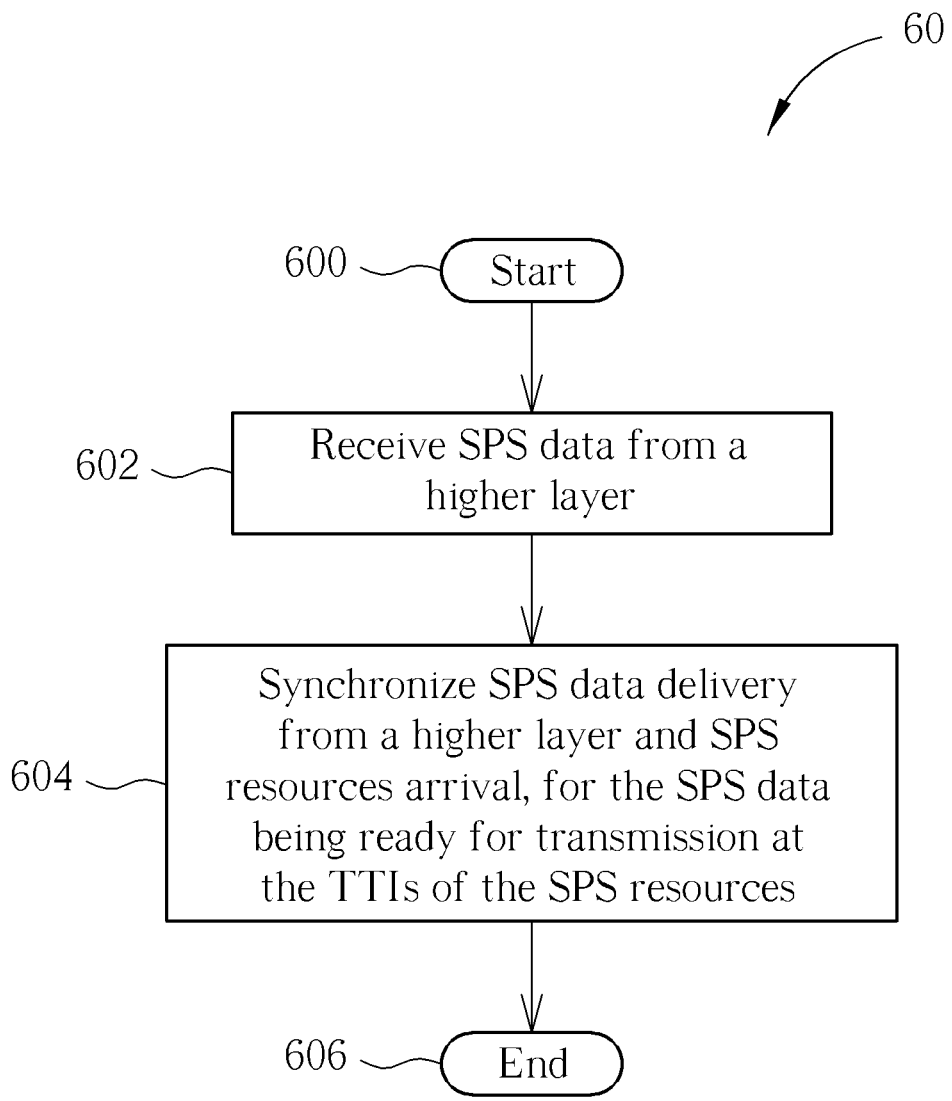
FIG. 13 is a flowchart of a process according to an embodiment of the present invention.

In addition, the second issue can be solved by a synchronization mechanism introduced as follows instead of the threshold mechanism. Please refer to FIG. 13, which is a flowchart of a process 60 according to an embodiment of the present invention. The process 60 is utilized in the UE MAC for solving the second issue, for improving the trigger mechanism of BSR-SR when SPS resources are configured. The process 60 can be compiled into the program code 214 and includes the following steps:

Step 600: Start.

Step 602: Receive SPS data from a higher layer.

Step 604: Synchronize the SPS data delivery and SPS resources arrival, for the SPS data being ready for transmission at the TTIs of the SPS resources.

Step 606: End.

Figure 14:
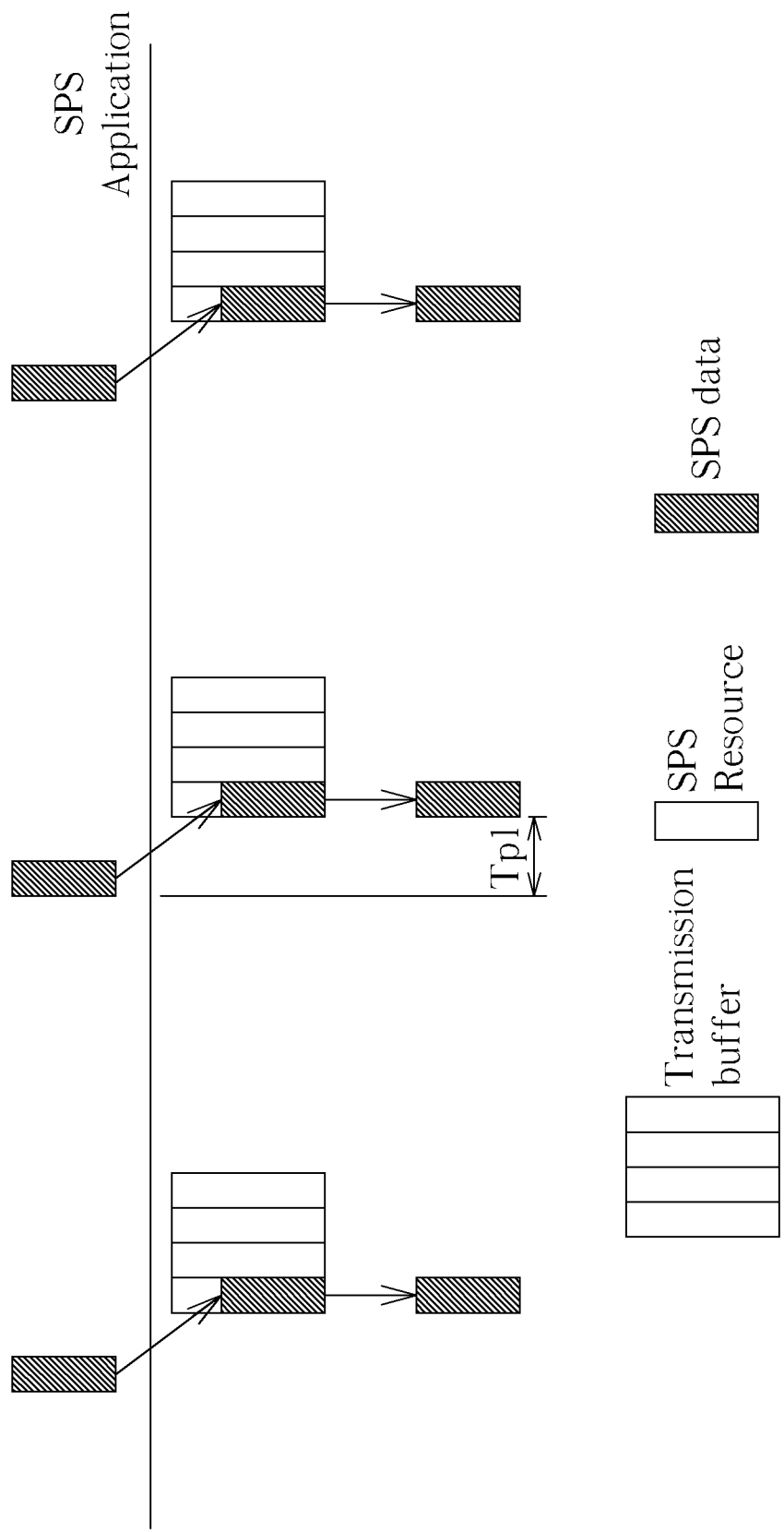
FIG. 14 is a timing diagram illustrating a relationship between the SPS data delivery and the SPS resources according to the process in FIG. 13.

According to the process 60, the MAC synchronizes the SPS data delivery from the higher layer, e.g. SPS application, and the SPS resources, so that the SPS data is ready to be transmitted with the destined SPS resources. Therefore, premature SRs are not triggered. Please refer to FIG. 14, which is a timing diagram illustrating a relationship between the SPS data delivery and the SPS resources according to the process 60. As shown in FIG. 14, when the SPS data is delivered to the transmission buffer just a processing time Tp1 before next SPS resource, the SPS data can catch the SPS resources periodically, i.e. the SPS data delivery and the SPS resources are synchronized. Step 604 can be implemented by several ways as follows to achieve synchronization.

One is the MAC sending an indication to the higher layer, which includes information of a time point that the higher layer has to deliver the SPS data, for the SPS data being ready for transmission at the TTIs of the SPS resources. If there is SPS data to be transmitted in the higher layer, the higher layer delivers the SPS data to the transmission buffer on the time point indicated by the indication; and if there is no SPS data to be transmitted in the higher layer, the higher layer just receives the indication and does not generate SPS data for the indication.

Figure 15:
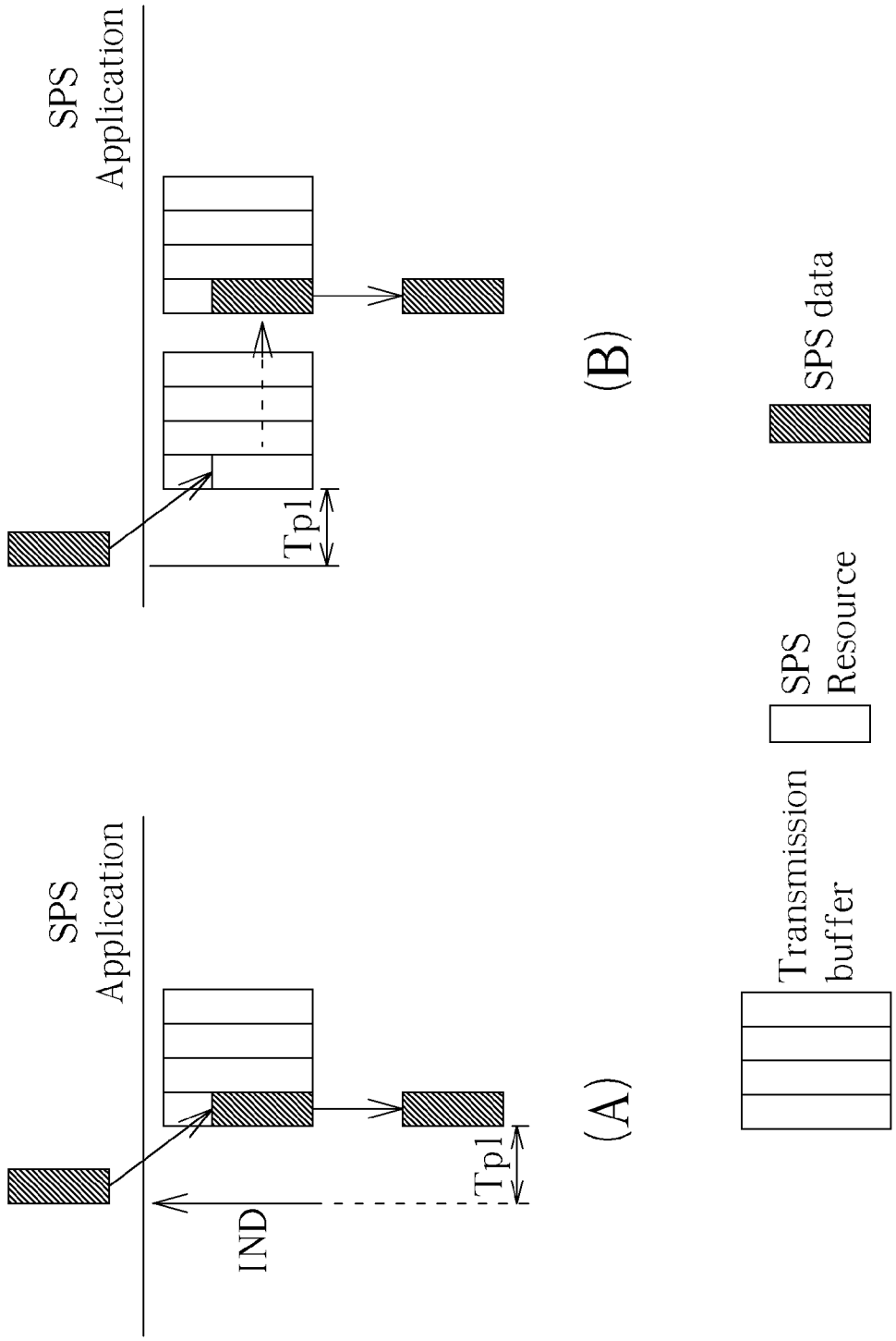
FIG. 15(A) and FIG. 15(B) are schematic diagrams of implementations of the process in FIG. 13.

For example, please refer to FIG. 15(A) and FIG. 15(B), which are schematic diagrams of implementations of the process 60. In FIG. 15(A), the MAC sends an indication IND just one processing time Tp1 before the SPS resource to inform the higher layer to deliver the SPS data now. Besides, the MAC can also send an indication IND to inform the higher layer to release the SPS data after t ms. Then, t ms after sending the indication, the UE still has enough processing time to process the SPS data such that the SPS data is just ready for transmission at the TTI of the SPS resource. Note that, the indication can be sent just once and the higher layer follows the setting in the indication to deliver SPS data.

Another way is when the SPS data arrives at the transmission buffer, the MAC hiding the SPS data from a lower layer until TTIs of SPS resource arrival. The MAC uses a tag to hide the SPS data. As shown in FIG. 15(B), the SPS data is delivered to the MAC much earlier than one processing time before the SPS resource and is hidden by the tag. The SPS data becomes visible when the SPS resource is available and therefore the SPS data catches the SPS resource.

As the second issue mentioned previously, when SPS resources are configured, the unsynchronization of the SPS data delivery and the SPS resource results in unnecessary BSR-SR triggering. In comparison, according to the process 60, whatever an indication or a tag is used, the SPS data is delivered to the transmission buffer at least one processing time before the TTI of the SPS resource, so that the SPS data catch the SPS resource. Therefore, a premature SR is not triggered.

Figure 16:
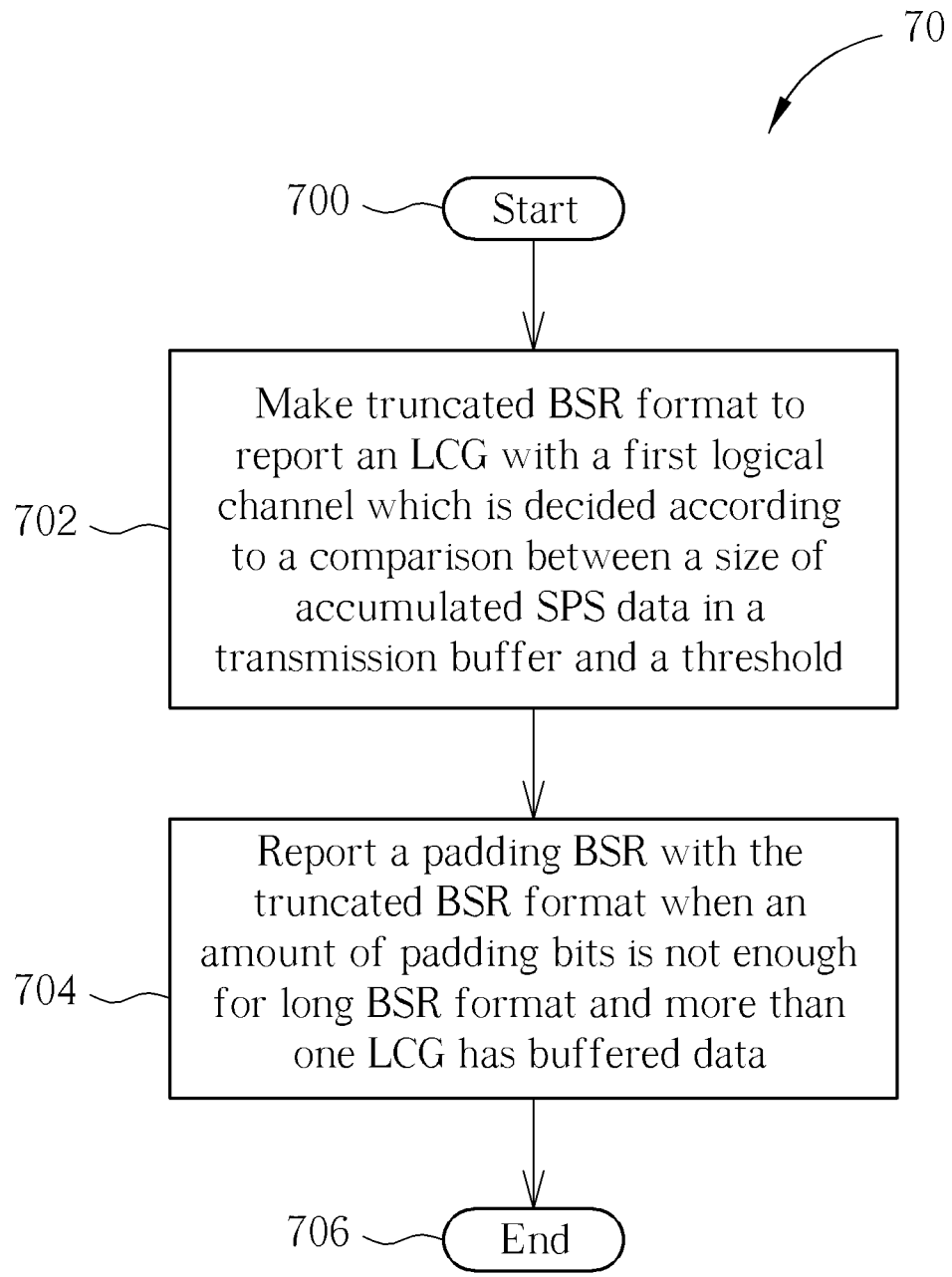
FIG. 16 is a flowchart of a process according to an embodiment of the present invention.

As the fourth issue mentioned previously, when SPS is introduced in the specifications, if SPS resources are configured, the eNB does not really need the information reported by the truncated BSR because the highest priority logical channel is SPS logical channel. Please refer to FIG. 16, which is a flowchart of a process 70 according to an embodiment of the present invention. The process 70 is utilized in the UE MAC for solving the fourth issue, for improving the trigger mechanism of BSR-SR when SPS resources are configured. The process 70 can be compiled into the program code 214 and includes the following steps:

Step 700: Start.

Step 702: Make truncated BSR format to report an LCG with a first logical channel which is decided according to a comparison between a size of accumulated SPS data in a transmission buffer and a threshold.

Step 704: Report a padding BSR with the truncated BSR format when an amount of padding bits is not enough for long BSR format and more than one LCG has buffered data.

Step 706: End.

Step 702 modifies the use of the truncated BSR such that the MAC can report with the truncated BSR format with necessary LCG information to the eNB. Note that the threshold mechanism introduced previously is applied to the process 70, to help the MAC to make the right decision for what kind of LCG the truncated BSR should report. Step 702 is detailed described as follow. The UE MAC makes the truncated BSR format to report the LCG with the highest priority logical channel excluding SPS logical channels when the size of the accumulated SPS data in the transmission buffer is smaller than the threshold. Moreover, the UE MAC makes the truncated BSR format to report the LCG with SPS logical channel(s) when the size of the accumulated SPS data in the transmission buffer is larger than the threshold, which means that the allocated SPS UL resources are not enough for transmission and the eNB really needs to know the report of the LCG. Whether the first logical channel in Step 702 is the highest priority channel excluding the SPS logical channel or is just SPS logical channel depends on the comparison between the size of accumulated SPS data and the threshold. Note that the threshold in the process 70 is similar to the second threshold in the process 30, and can be set to a specific value, such as a size of an allocated UL grant or more than one UL grant, or set according to the sum of uplink grants during a time window. Furthermore, the threshold can also be set to a predetermined value not according to any UL grant or time window.

According to the current specification, when the SPS resources are configured, the UE still uses the truncated BSR format to report LCG with the highest priority logical channel, the SPS logical channel, which is probably unnecessary information for the eNB when allocated SPS resource is large enough. In comparison, the present invention applies the threshold mechanism to determine if the truncated BSR format reports the LCG with the SPS logical channel (s) or the LCG with the highest priority logical channel(s) excluding SPS logical channel(s). Therefore, the condition of reporting the truncated BSR is improved and the UE does not report unnecessary LCG information of SPS logical channel to the eNB.

Figure 1:
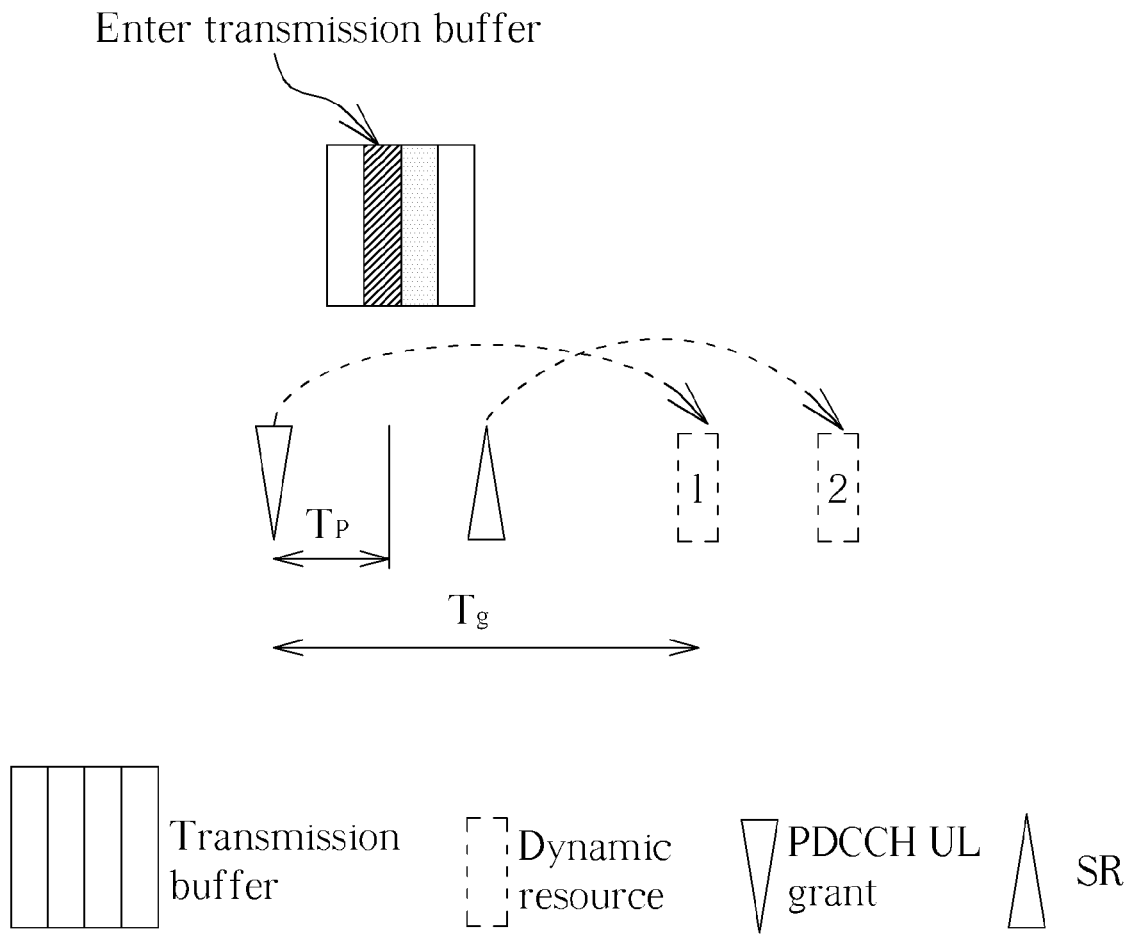
FIG. 1 is a timing diagram illustrating a relationship between an allocated UL grant and an SR in dynamic scheduling according to the prior art.
Figure 2:
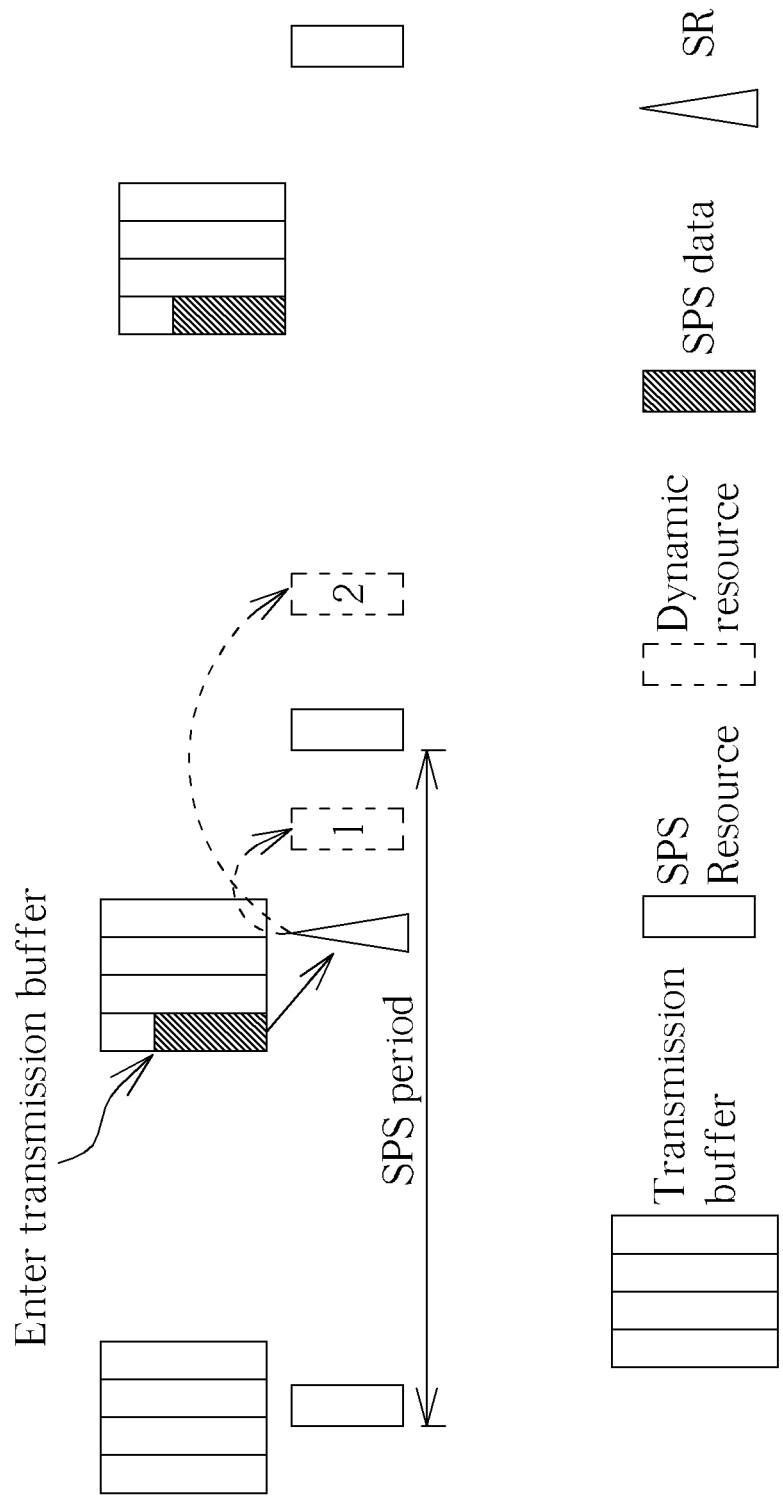
FIG. 2 is a timing diagram illustrating a relationship between an allocated SPS UL resource and an SR according to the prior art.
Figure 3:
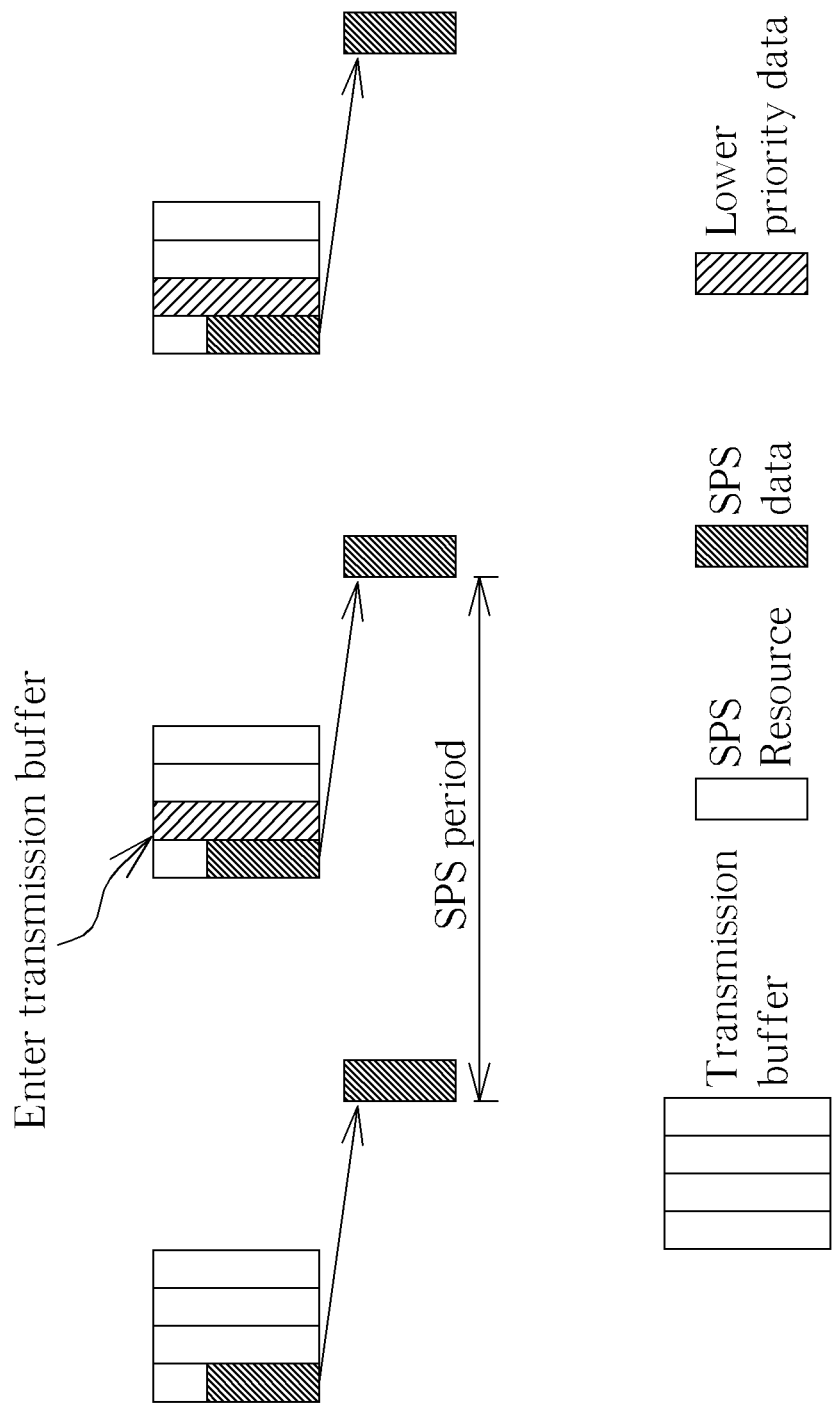
FIG. 3 is a timing diagram illustrating a relationship between SPS resources and lower priority data according to the prior art.
Figure 5:
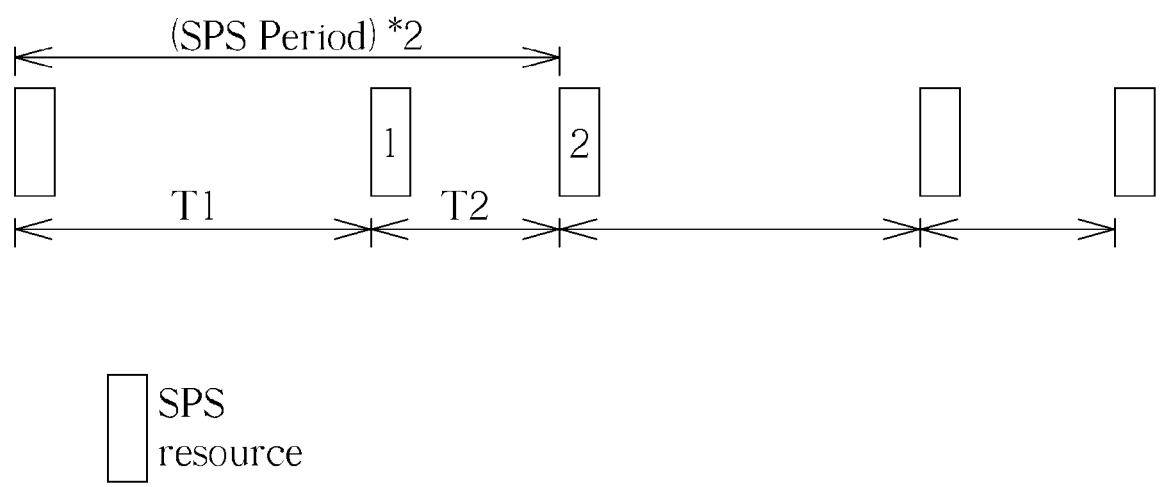
FIG. 5 is a timing diagram of a multiple-SPS-patterns scheme for TDD mode.

As the fifth issue mentioned previously, SPS resource allocation in TDD (Time Division Duplex) mode meets the same problems, e.g. premature SR and starvation for transmission of lower priority data, as in FDD (Frequency Division Duplex) mode. The threshold mechanism for SPS introduced as above are designed based on FDD mode, and can also be applied in TDD mode with a threshold designed for TDD. Please refer to FIG. 5 again. As shown in FIG. 5, T2 is short. If the UL resource 1 cannot accommodate SPS data available for transmission in the transmission buffer, the UE does not really need to trigger an SR and just waits until next UL resource 2 arriving because T2 is short. In other words, the threshold is set according to a time window such that the UL resource 2 is included in the threshold; or, the threshold is set according to two times of the data which could be transmitted in a single SPS resource. The threshold setting is similar to those mentioned previously and is not repeated. Besides, even though conflict between the TDD UL/DL configuration and SPS resource configuration may occur and results in cancelled SPS UL resources, the UE can predict such conflict occurrence and modify threshold accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a trigger mechanism of buffer status report (BSR) and scheduling request (SR) when semi-persistent scheduling (SPS) resource are configured for a media access control layer of a user equipment in a wireless communication system, the method comprising:

receiving data;

when the received data are non-SPS data, the non-SPS data arrives at a transmission buffer, where data belonging to an SPS logical channel is already existed, and the non-SPS data belongs to a logical channel with higher priority than priorities of logical channels, except the SPS logical channel, of any other non-SPS data already existed in the transmission buffer, triggering a BSR and SR; and while transmitting SPS data, keeping the triggered SR from being cancelled by the transmitted SPS data, until the user equipment receives an uplink grant assigned by a network of the wireless communication system for transmission of the received non-SPS data.

2. A communication device of a wireless communication system for a trigger mechanism of buffer status report (BSR) and scheduling request (SR) when semi-persistent scheduling (SPS) resource are configured for a media access control layer, the communication device comprising:
- a computer readable recording medium for storing program code corresponding to a process; and
- a processor coupled to the computer readable recording medium, for processing the program code to execute the process, wherein the process comprises:
  receiving data;
  when the received data are non-SPS data, the non-SPS data arrives at a transmission buffer, where data belonging to an SPS logical channel is already existed, and the non-SPS data belongs to a logical channel with higher priority than priorities of logical channels, except the SPS logical channel, of any other non-SPS data already existed in the transmission buffer, triggering a BSR and SR; and
- while transmitting SPS data, keeping the triggered SR from being cancelled by the transmitted of SPS data, until the user equipment receives an uplink grant assigned by a network of the wireless communication system for transmission of the received non-SPS data.

\* \* \* \* \*